United States Patent [19]

Minoshima et al.

[11] Patent Number: 5,703,461
[45] Date of Patent: Dec. 30, 1997

[54] INDUCTIVE COUPLER FOR ELECTRIC VEHICLE CHARGER

[75] Inventors: Norimoto Minoshima; Yasuharu Odachi, both of Aichi-ken, Japan

[73] Assignee: Kabushiki Kaisha Toyoda Jidoshokki Seisakusho, Kariya, Japan

[21] Appl. No.: 671,218

[22] Filed: Jun. 27, 1996

[30] Foreign Application Priority Data

Jun. 28, 1995 [JP] Japan ........................ 7-162521
Jun. 28, 1995 [JP] Japan ........................ 7-162523

[51] Int. Cl.$^6$ ........................ H01M 10/46; H01F 27/06
[52] U.S. Cl. ........................ 320/2; 336/66
[58] Field of Search ........................ 320/2; 336/66

[56] References Cited

U.S. PATENT DOCUMENTS

4,347,472  8/1982  Lemelson ........................ 320/2
4,800,328  1/1989  Bolger et al. ........................ 320/2
5,070,293  12/1991  Ishii et al. ........................ 320/2
5,216,402  6/1993  Carosa ........................ 336/66
5,539,296  7/1996  Ito ........................ 320/2

*Primary Examiner*—Peter S. Wong
*Assistant Examiner*—Patrick B. Law
*Attorney, Agent, or Firm*—Brooks Haidt Haffner & Delahunty

[57] ABSTRACT

An inductive coupler for use in a battery charging system for an electric vehicle has a primary device having a primary coil and a core and a secondary device having a secondary coil and core. The primary and secondary devices are coupleable together with the primary coil placed within an open space defined by the secondary coil. The secondary coil is formed and sized so as to have a greater dimension than the primary coil as measured in the longitudinal direction of an electric vehicle parked for battery charging so that a space interval between the two coils in the longitudinal direction of the vehicle is greater than that in the lateral direction of the vehicle.

10 Claims, 7 Drawing Sheets

INDUCTIVE COUPLER FOR ELECTRIC VEHICLE CHARGER

FIELD OF THE INVENTION

The present invention relates generally to an apparatus for charging a battery of an electric vehicle, and more specifically to an inductive coupler for use in such battery charging apparatus.

BACKGROUND OF THE INVENTION

A battery charging system for electric vehicles plays a key role for utilization of such vehicles and, therefore, the ease of handling the charging system helps to make the electric vehicles acceptable to the market and more popular among the prospective users. Thus, an easy to handle battery charging system is strongly demanded by the electric vehicle market.

Generally, a battery charger is located on the ground in a garage or like place, and battery charging can be accomplished by engaging or operatively connecting an inductive coupler comprising a primary device forming a part of the battery charger connected to a power source and a secondary device carried by an electric vehicle and connected to a propulsion battery of the vehicle. In a typical inductive coupler, the primary device includes a primary coil wound around a core and connected to the power source, while the secondary device includes a secondary coil wound around a core and connected to the battery on the electric vehicle, and the primary device is movable relative to the vehicle so as to be operatively engaged or coupled with the secondary device carried by the vehicle. In this coupled position of the inductive coupler, the primary and secondary devices are disposed one on the other with the two cores in abutment with each other and the primary coil accommodated within an open space defined by the secondary coil. As is well known in the art, flowing a charging current in the primary coil induces an electromotive force in the secondary coil through electromagnetic induction and the resulting electromotive force in the secondary is utilized for charging the battery.

Though the primary and secondary devices may be coupled manually by a vehicle driver according to a method as disclosed in U.S. Pat. No. 5,216,402, the coupling operation should be performed advantageously in an automatic manner for the sake of ease and convenience. Such automatic coupling may be accomplished by driving a vehicle to a predetermined parking location in a garage and then moving the primary device of the coupler, using any suitable drive means such as an actuator, to a position where it is coupled with the secondary device.

In order to achieve the desired coupling for successful charging in the above automatic coupling arrangement, however, the vehicle should be driven carefully and parked at an intended position relative to the ground charger. For this purpose, a wheel stop is placed at an appropriate location in the garage to help the driver to stop the vehicle at the intended position.

Even with the aid of such wheel stop, it may happen depending on the driving skill that the driver moves the vehicle only to a position short from the wheel stop or beyond the intended position with the wheels partly placed on the stop. Thus, it is still difficult for the vehicle to be stopped at an optimum position for battery charging operation.

It can be readily understood that, if the vehicle is parked with a slight error in the longitudinal direction of the vehicle with respect to its intended charging position, the movable primary coil may strike the secondary coil without being snugly fitted within the space of the latter coil. If this happens, battery charging operation cannot be initiated. Alternatively, even if charging can be initiated somehow, the charger will fail to transfer enough power to charge the battery to a desired level.

Another problem is that if the vehicle is driven inadvertently to move away from the primary device during the charging operation or just after the battery charging operation is completed but before the couple is decoupled, the secondary coil then moving horizontally away from the primary coil will collide against the primary coil, thereby inviting a fear of damage to either or both of the coils. Additionally, the secondary device having a core increases the weight of the vehicle.

SUMMARY OF THE INVENTION

Therefore, an object of the present invention is to provide an inductive coupler which is designed so as to prevent interference between the primary and secondary coils when the coupler is being engaged for coupling.

Another object of the invention is to provide an inductive coupler in which an error in the relative positioning of the secondary device of the coupler with respect to the primary device does not seriously affect the battery charging efficiency.

Still another object of the invention is to provide an inductive coupler which can prevent collision between the primary and secondary coils even if the vehicle is moved inadvertently in a direction to decouple the coupler during charging operation.

The inductive coupler according to the invention, which is designed to solve the above problems, is adapted for use in a battery charging system for an electric vehicle parked at a position, for example, in a garage, which inductive coupler comprises a primary device connected to an AC power source and having a primary coil, and a secondary device mounted on the vehicle and having a secondary coil. The primary and secondary devices are coupleable with one (i.e., either) of the primary and secondary coils placed within an open space defined by the other of the two coils for inducing an electromotive force in the secondary coil by flowing a current in the primary coil in the coupled position of the coupler. Said other coil surrounding said one coil is formed and sized so as to have a greater dimension than said one coil as measured in a given direction with respect to the parked vehicle so that a spaced interval formed between the two coils in the above given direction is greater than that in a direction perpendicular to the given direction.

By so forming the above other coil in relation to the one coil, the resulting greater spaced interval between the two coils in the specific direction of the vehicle can accommodate an error, if any occurs, in the relative positions between the primary and secondary devices of the inductive coupler in the above direction.

In order to prevent the collision between the primary and secondary coils even when the vehicle is moved inadvertently in a direction to decouple the coupler, the above other coil is provided with a portion that is bent so as to provide a path through which the one coil moves without colliding against the other coil due to relative movement of the two coils. According to the invention, the collision due to inadvertently driving the vehicle is prevented also by disposing the primary and secondary devices at a specific orientation with respect to the longitudinal direction of the vehicle and at a selected inclination angle.

In one form of embodiment according to the invention, the secondary device includes a core having at least one recess for receiving therein part of the primary coil such that a spaced interval between the primary and secondary coils in a given direction is greater than that in a direction perpendicular to the given direction, and one core that surrounds the other core has a portion movable to close the recess after said primary and secondary devices are coupled together.

The above and other objects and features of the invention will be apparent from the following detailed description of preferred embodiments of the invention in conjunction with the accompanying drawings.

DETAILED DESCRIPTION OF PREFERRED EMBODIMENTS

FIRST EMBODIMENT

Figure 1:
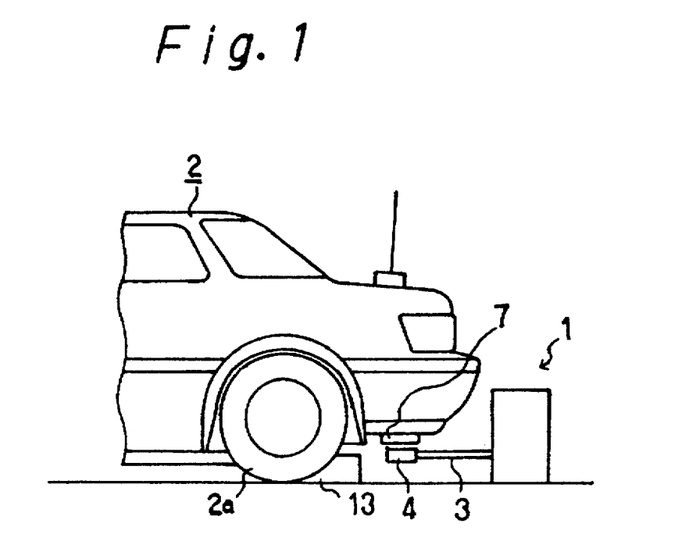
FIG. 1 is a schematic side view showing an electric vehicle parked in a garage and a charger on the ground.

The first preferred embodiment of inductive coupler according to the present invention will be described while having reference to FIGS. 1 to 5. Referring to FIG. 1, there is shown a positional relation between an electric vehicle 2 (hereinafter "vehicle") having a battery (not shown) to be charged and parked with its rear wheels 2a in contact with a wheel stop 13 in a garage and a charger 1 located at a predetermined position on the ground in the garage. The charger 1 has an arm 3 extending horizontally toward the vehicle 2 for supporting at its free end a primary device 4 of an inductive coupler. The support arm 3 is movable horizontally in widthwise or lateral direction of the vehicle 2 and also in a vertical direction toward and away from a secondary device 7 mounted on the rear bottom of the vehicle 2 and forming the inductive coupler with the above primary device 4. Normally, the support arm 3 is retracted at its lowered position at a stroke end of its lateral movement.

Figure 2:
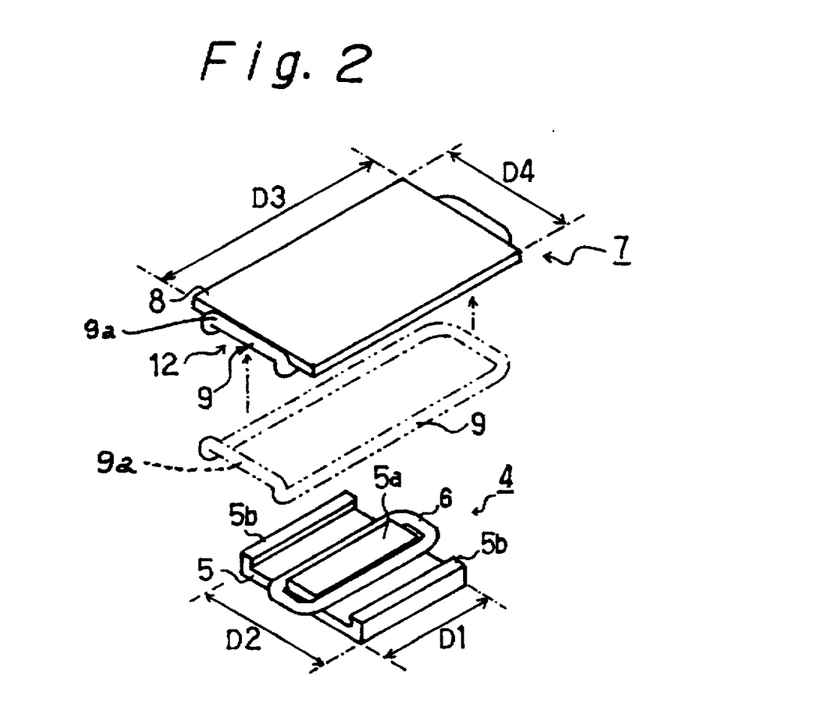
FIG. 2 is a perspective view of an inductive coupler of a preferred embodiment of the invention, comprising primary and secondary devices shown here in their decoupled state.

As shown in FIG. 2, the primary device 4 includes a core 5 made of magnetic material and having an E-shape in cross section and a coil 6 wound around the center projection 5a of the E-shaped core. The center projection 5a of the core 5 extends or elongates in the longitudinal direction of the vehicle 2. The core 5 has projections 5b on opposite lateral sides of and in parallel to the center projection 5a. As shown more clearly in FIG. 4, each of the projections 5b on opposite lateral sides of the primary core 5 has a wedge-shaped jaw portion 5c extending inward so as to present an enlarged flat top surface. Incidentally, the primary core 5 in the illustrated embodiment has a length D1 of about 100 mm and a width D2 of about 160 mm. The primary core 5 thus constructed is fixedly mounted to the free end of the support arm 3 for the horizontal and vertical movements therewith.

Referring back to FIG. 2, the secondary device 7 of the inductive coupler includes a core 8 made of magnetic material and having a rectangular plate shape and a coil 9 fixed to the bottom surface of the core 8. The secondary core 8 has a length D3 about twice as much as the length D1 of the primary core 4, or about 200 mm, and a width D4 that is the same as the width D2 of the primary core, or about 160 mm.

Figure 3:
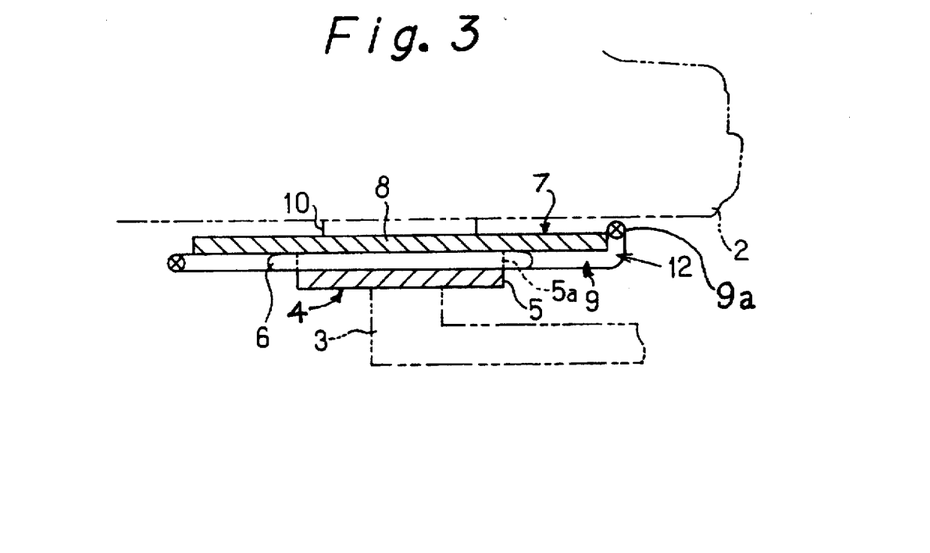
FIG. 3 is a side sectional view of the inductive coupler of FIG. 2 in the coupled state.

The secondary coil 9 is generally shaped into a rectangular shape whose longitudinal dimension along D3 is substantially greater than its lateral dimension along D4, and the opposite longitudinal ends thereof extends beyond longitudinal ends of the core 8. As shown in FIGS. 2 through 5, the rear end portion of 9a the secondary coil 9 that extends beyond the corresponding end of the core 8 is bent upward away from the primary coil 6 so that, even when the devices 4, 7 are coupled as will be described below, the secondary device 7 is movable rightward, as seen in FIG. 2, in the longitudinal direction without interference between the primary and secondary coils 6, 9. Thus, the bent portion 9a of the secondary coil 9 provides for a path as indicated by arrow 12 for that secondary coil. As shown in FIG. 3, the secondary core 8 is fixedly mounted to the vehicle bottom by way of a fixing member 10.

Figure 4:
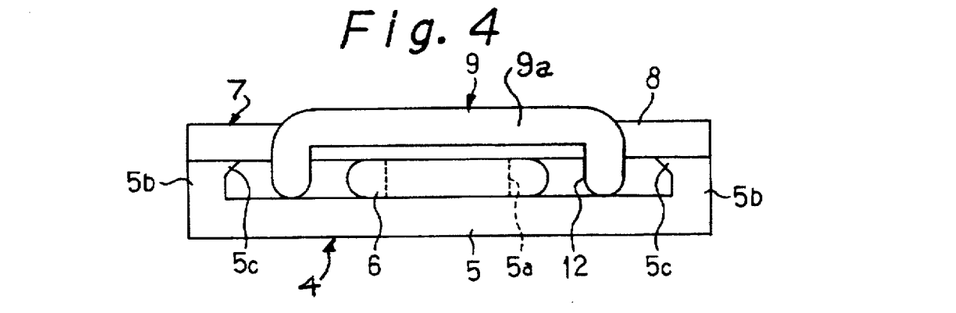
FIG. 4 is a front view of the inductive coupler of FIG. 3.
Figure 5:
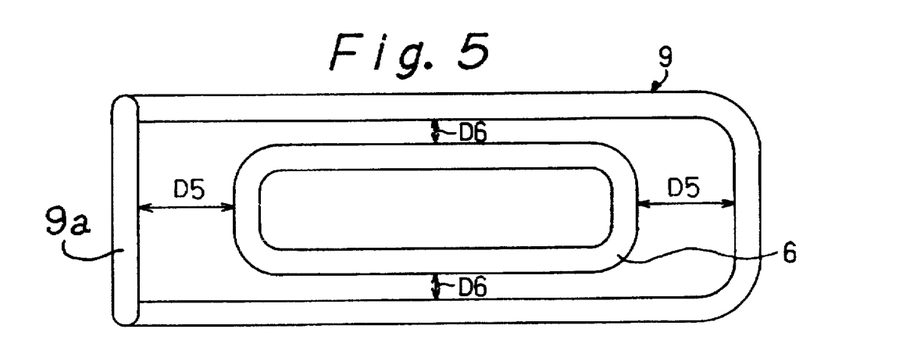
FIG. 5 is a plan view showing relative positions of primary and secondary coils of the inductive coupler.

In the coupled position of the coupler, the primary coil 6 is placed within a substantially rectangular space defined by the secondary coil 9, as shown in FIGS. 3 through 6. Referring specifically to FIG. 5, the secondary coil 9 is so sized and formed that a longitudinal spaced interval D5 is provided between the adjacent longitudinal ends of the primary and secondary coils 6, 9 in the above coupled position, the dimension of which spaced interval D5 is much greater than a lateral spaced interval D6 between the adjacent lateral sides of the two coils 6, 9.

The ground charger 1 is located at a predetermined location in the garage in relation to the wheel stop 13 against which the vehicle 2 is parked with its rear wheels 2a bearing against the stop. As mentioned earlier, the arm 3 carrying at its end the primary device 4 of the inductive coupler is movable by any suitable means both horizontally in lateral direction of the vehicle 2 and in a vertical direction. In the illustrated embodiment, the charger 1 is so arranged that, when the vehicle 2 is parked properly against the wheel stop 13, its secondary device 7 is positioned such that the primary device 4 moving horizontally in the lateral direction relative to the stop 13 can move past just below the secondary device 7 as shown in FIG. 1.

The following will describe the operation of the inductive coupler thus constructed.

Battery charging operation is commenced after the vehicle 2 has been parked against the wheel stop 13. The support arm 3, which is then located at its lowered position, is moved from one stroke end of its lateral movement toward the other stroke end until the primary device 4 reaches a position immediately below the secondary device 7, which position may be detected by any suitable means such as photoelectric or magnetic sensor (not shown). Subsequently, the support arm 3 is elevated to bring the primary device 4 into engagement with the secondary device 7 for coupling thereof as shown in FIGS. 3 and 4. In the coupled state, the primary coil 6 is accommodated within the space of secondary coil 9 and the top surfaces of the projections 5a, 5b of the primary core 5 are in abutment with the bottom surface of the secondary core 8, thus the coupler then forming a device similar to a transformer. In this coupled condition, the charger 1 supplies to the primary coil 6 a charging AC current, which induces a similar current in the secondary coil 9 under the effect of electromagnetic induction and the AC current thus transferred from the primary to the secondary is rectified by any appropriate circuit into a DC current which is delivered to the battery for charging the same.

In raising the primary device 4 for coupling engagement with the secondary device 7, the provision of the spaced interval D5 on opposite longitudinal end portions helps the primary coil 6 to be brought safely within the rectangular space of the secondary coil 9 without interfering with the secondary coil 9 even if the vehicle 2 is parked with an error in the positioning of its secondary device 7 with respect to the primary device 4 in the longitudinal direction of the vehicle 2.

Additionally, even if the vehicle 2 is moved inadvertently forward away from the stop 13 during or just after the charging operation while the devices 4, 7 are still in their coupled position, the secondary device 7 can be withdrawn and released safely from the primary device 4 without colliding therewith because of the provision of the path 12 provided by the upward bend 9a of the secondary coil 9 at its rear end portion.

Because the top surfaces of the two lateral projections 5b of the primary core 5 are widened at 5c, a slight offset or error, if any, in the lateral positioning of the primary device 4 with respect to the secondary device 7 can be accommodated and, therefore, adequate abutment can be effected between the primary and secondary cores 5, 8, thus a magnetic circuit being formed by the cores.

Additionally, the use of the flat core 8 for the secondary device 7 on the vehicle 2, which is lighter than an E-shaped core, can contribute to reduction in weight of the vehicle 2. It is to be noted, however, that the secondary core according to the invention does not necessarily have to be flat-shaped, but it may be of an E-shape while the primary core is configured flat.

The secondary device 7 of the inductive coupler, which is installed on the rear bottom of the vehicle 2 in the above-described embodiment, may be mounted on the front bottom, or either front or rear side of the vehicle. In the case of the front bottom mounting, a driver or a charger operator can drive to move the vehicle forward with less effort to locate the vehicle against the wheel stop 13. In the case of the front or rear side mounting, the coupled condition of the primary and secondary devices can be checked advantageously visually.

Figure 6:
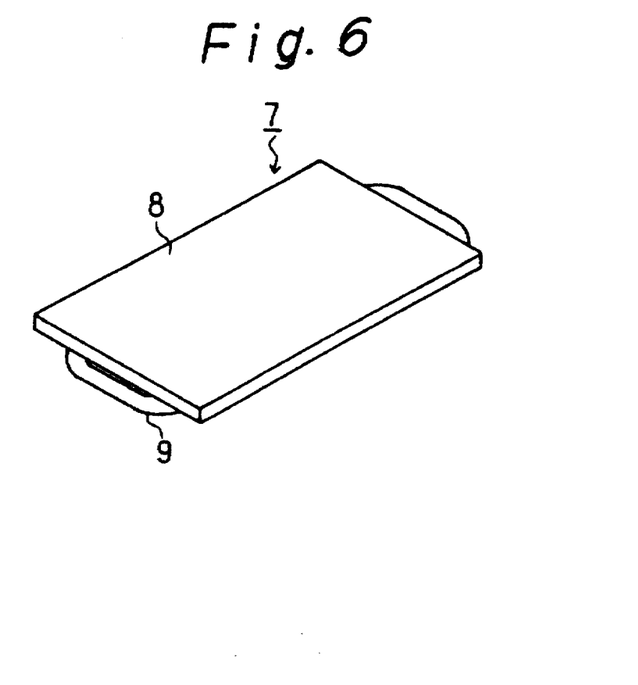
FIG. 6 is a perspective view of a primary device of the inductive coupler, showing a modified primary coil.
Figure 7:
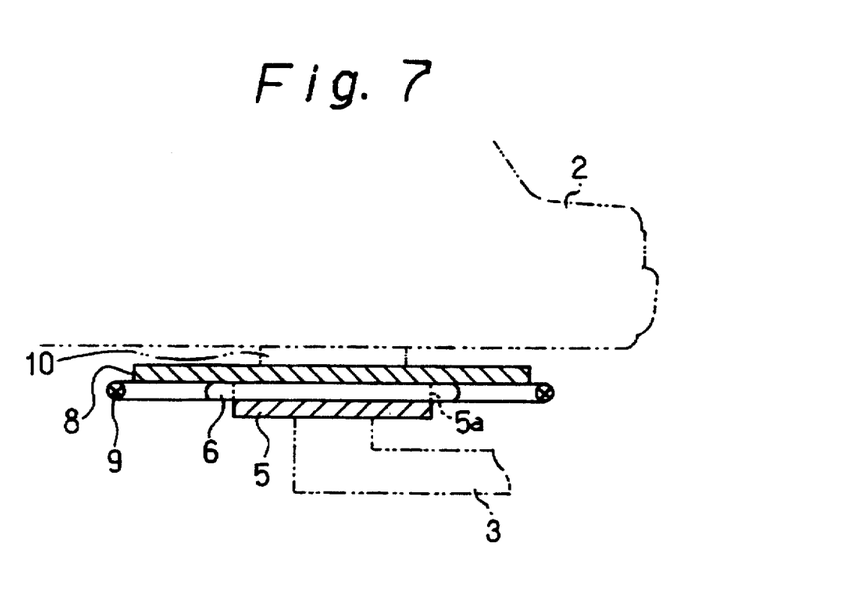
FIG. 7 is a side sectional view of the inductive coupler of FIG. 6 in its coupled position.

According to the invention, the secondary coil 9 may be formed without the upward bending, 9a as shown in FIGS. 6 and 7. In this case, the path 12 in the embodiment shown in FIG. 2 is not available and, therefore, the coil 9 will collide against the secondary coil 6 if the vehicle is driven away from the wheel stop 13 while the devices 4, 7 are in coupled position. However, such modified secondary coil 9 is advantageous in that the coil can be manufactured with less cost.

As a further modification of the above embodiment, the primary and secondary devices 4, 7 of the inductive coupler may be arranged so as to be turned by 90°, that is, be disposed with the sides along D1 and D3 thereof oriented perpendicularly with respect to the longitudinal direction of the vehicle 2. In such a modified embodiment, the spaced intervals D5 will be provided in the lateral direction of the vehicle and, therefore, an error in parking position of the vehicle in the lateral direction can be accommodated by these spaces.

SECOND EMBODIMENT

Figure 8:
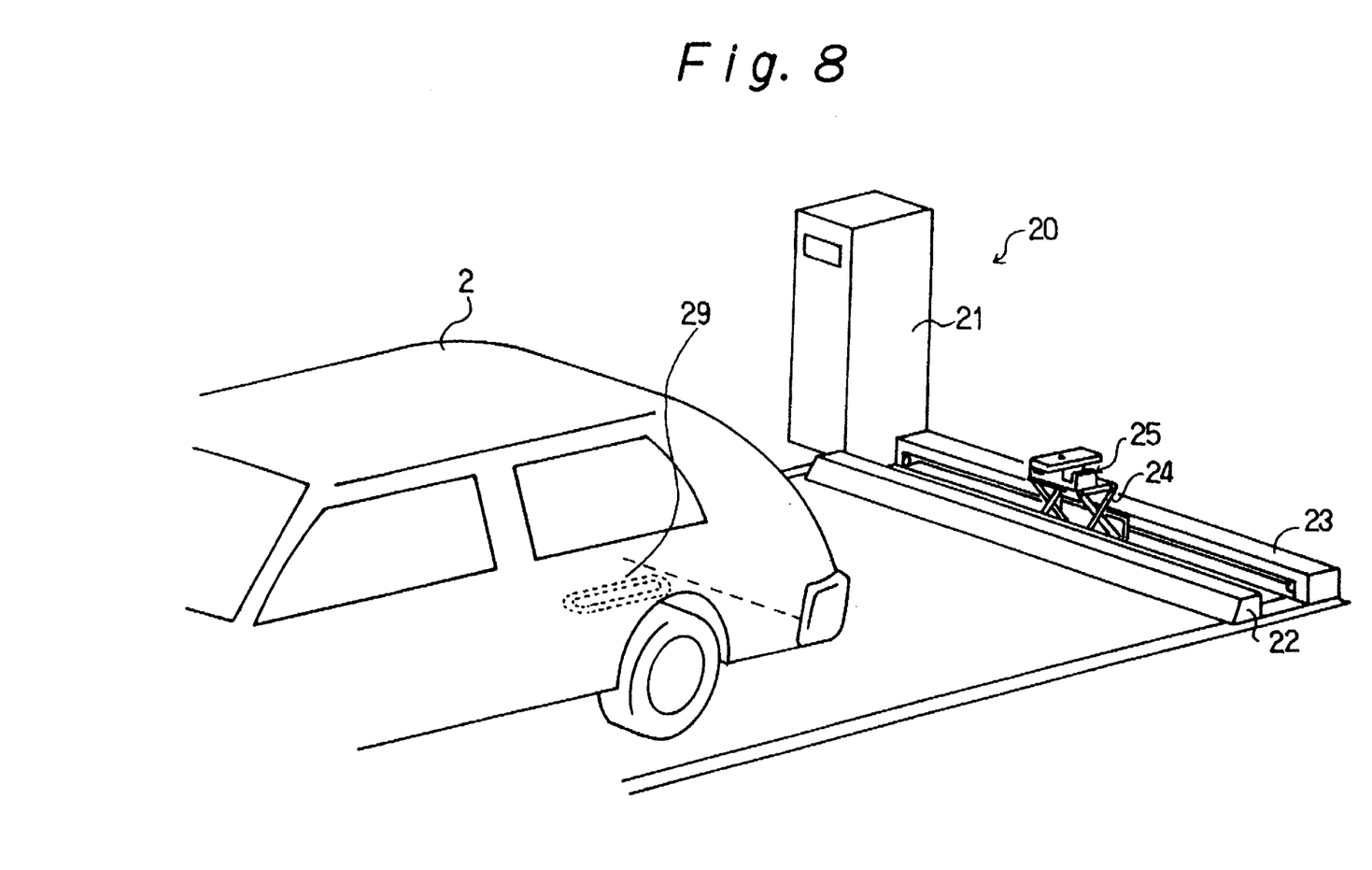
FIG. 8 is a perspective view showing a second preferred embodiment of an inductive coupler according to the invention.
Figure 9:
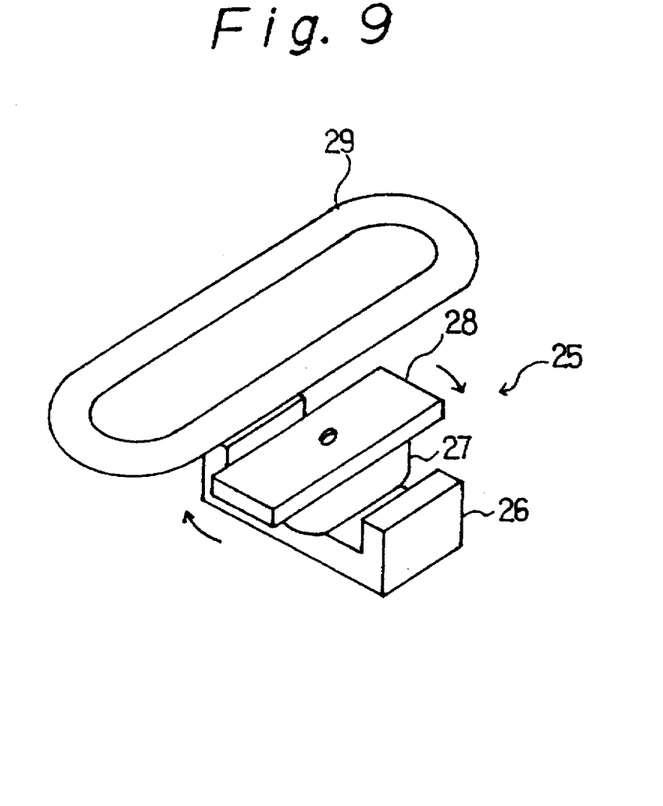
FIG. 9 is an enlarged perspective view of the inductive coupler of FIG. 8, showing its decoupled state.
Figure 10:
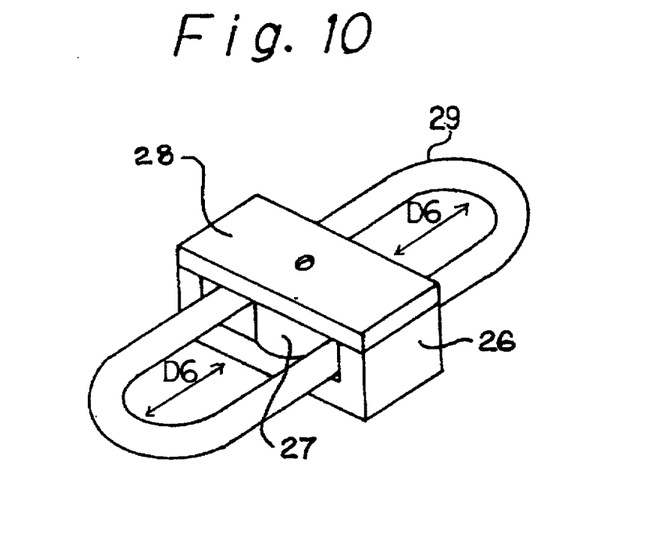
FIG. 10 is a perspective view of the inductive coupler of FIG. 9, showing its coupled state.

The following will describe a second preferred embodiment of the present invention while having reference to FIGS. 8 to 10.

There is shown a ground charger 20 disposed in a garage and including a charger unit 21, a primary device 25 of the inductive coupler, a wheel stop 22, a device 23 for moving the primary device 25 along the extension of the wheel stop 22 and a pantograph type device 24 for elevating the primary device 25. On the other hand, the vehicle 2 carries on its rear bottom a secondary device comprising a coil 29. With the vehicle 2 located in the garage with its rear wheels bearing against the wheel stop 22, the secondary coil 29 is placed just above the path along which the primary device 25 is moved by the device 23.

As seen more clearly in FIG. 9, the primary device 25 includes an E-shaped core 26, a primary coil 27 wound around the center projection of the E-shape of the core and a member 28 made of a magnetic material and rotatable about its center by a drive mechanism (not shown) so as to cover and uncover the recesses of the core 26 on opposite sides of the center projection of the E-shape. As apparent from FIGS. 9 and 10, the secondary device consisting of the coil 29 does not include a core.

In this embodiment, battery charging operation is initiated after the vehicle 2 has been parked properly in the garage in relation to the wheel stop 22. Though the primary device 25 is shown at its elevated position in the middle of the wheel stop 22 for the sake of clarity of illustration of the device 25, it is normally retracted at its lowered position at a stroke end of its crosswise or lateral movement along the wheel stop 22. When the vehicle is parked against the wheel stop 22, the primary device 25 is started to move from the retracted position in the lateral direction along the wheel stop 22 toward the other stroke end until it reaches a position immediately below the secondary coil 29, which position may be detected by any suitable means such as photoelectric sensor or magnetic sensor (not shown). Subsequently, the primary device 25 is raised by the elevating device 24 to a position where part of the secondary coil 29 is inserted in the recesses of the core 26 as shown in FIG. 10, whereupon the member 28 is rotated by 90° to close the core recesses as shown in FIG. 10, thus coupling of the primary device 25 and the secondary coil 29 is completed.

As seen clearly in FIG. 10, the secondary coil 29 is sized and shaped so as to provide relatively large spaced interval D6 between the primary coil 27 and the respective longitudinal ends of secondary coil 29 so that secondary coil 29 can be placed in the recesses of the core 26 without interference with the rotatable member 28 and also that coupling is effected safely without interference between the primary device 25 and the secondary coil 29 even if the vehicle is parked with an error in the longitudinal positioning of its secondary coil 29 with respect to the primary device 25. In this embodiment, wherein the secondary device of the coupler dispenses with a heavy core, the vehicle 2 can advantageously reduce its weight by the weight of a core if any were otherwise used.

Figure 11:
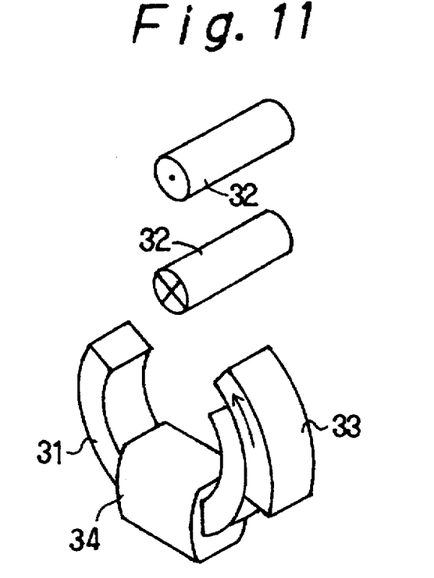
FIG. 11 is a perspective view of a modified inductive coupler of the second embodiment.
Figure 12:
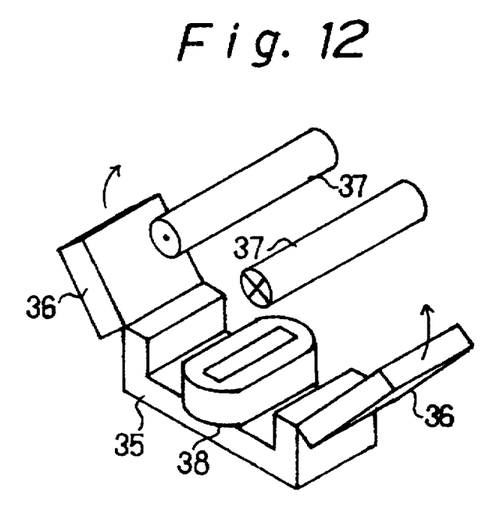
FIG. 12 is a perspective view of another modified inductive coupler of the second embodiment.

As a modification of this second embodiment, the core 26 of the primary device 25 may be substituted by a core having a shape other than the E-shape shown in FIGS. 9 and 10. As exemplified in FIG. 11, a C-shaped core 31 may be used which is open in the upper portion thereof and has a primary coil 34 wound around the bottom portion thereof. This core 31 has a slide member 33 made of magnetic material and movable along the arc of the C-shape so as to close the opening after the secondary coil 32 has been received in the core 31. As a still further modification, an E-shape core 35 with a pair of swingable members 36 made of magnetic material may be utilized. In this modification, the members 36 are swung in the directions of the arrows so as to close the recesses of the core 35 after they receive therein the secondary coil 37.

THIRD EMBODIMENT

Figure 13:
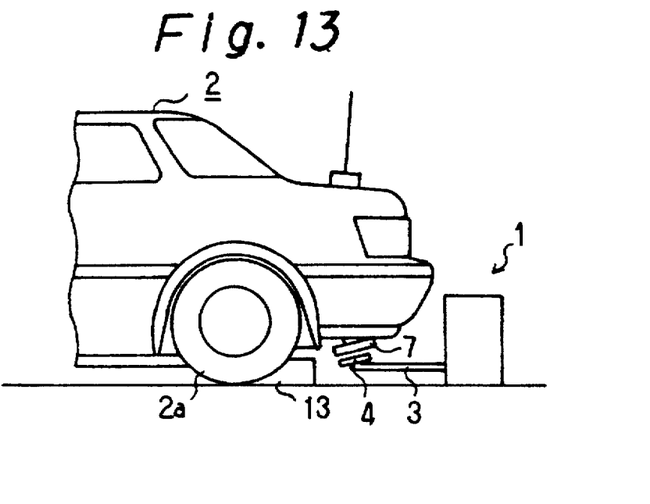
FIG. 13 is a schematic side view showing a third preferred embodiment of an inductive coupler according to the invention.
Figure 14:
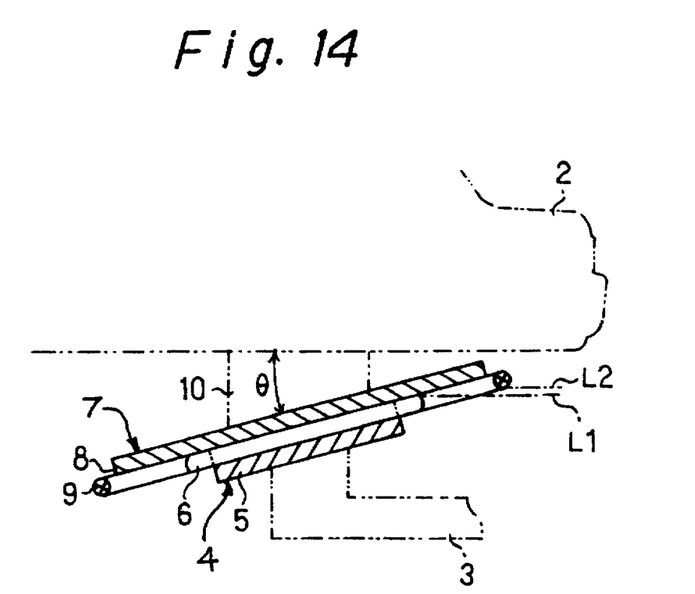
FIG. 14 is an enlarged side sectional view of the inductive coupler of FIG. 13.

The following will describe a third embodiment of the invention with reference to FIGS. 13 and 14. Since this embodiment differs from the first embodiment only in the manner of mounting the primary and secondary devices 4, 7 of the coupler as understood from FIG. 13, like reference numerals are used for like elements or parts and the description will focus only on features different from those of the first embodiment.

As shown in FIG. 14, the secondary device 7 having a coil 9 with no upward bend is substantially the same as the corresponding device shown in FIG. 6. Thus, no path 12 as provided in the embodiment of FIG. 2 is provided. The secondary device 7 is mounted to the vehicle's rear bottom by way of the fixing member 10 at an inclination angle θ in respect of the longitudinal direction of the vehicle 2 with the rear end of the secondary device 7 raised or disposed closer to the vehicle bottom than the opposite front end thereof. Likewise, the primary device 4 is mounted on the support arm 3 at the same inclination angle θ. Therefore, the primary and secondary devices of the coupler 4, 7 are couplingly engaged at the angle θ as shown in FIG. 14.

The angle θ is selected such that a horizontal line L1 passing at the highest point of the inclined primary coil 6 in the coupled position of the coupler is located below a horizontal line L2 passing at the lowest point of the rear end of the inclined secondary coil 9, as illustrated in FIG. 14.

In this embodiment of the coupler, when the vehicle 2 is moved inadvertently away from the wheel stop 13 during charging or immediately after the charging is over, the secondary coil 9 can be moved clear of the primary coil 6 without collision therebetween. Since the secondary coil 9 of this embodiment needs not be bent to provide the path 12 as in the first embodiment, the secondary device 7 of the coupler can be manufactured with less cost.

As in the aforementioned modification from the first embodiment, the secondary core 8 of FIG. 14 does not necessarily have to be flat-shaped, but it may be of an E-shape while the primary core is configured flat.

According to the invention, the location of the secondary device 7 is not limited to the rear bottom of the vehicle 2, but it may be provided on the front bottom of the vehicle 2.

While the invention has been described with reference to the specific embodiments, it is to be understood that the present invention can be practiced with further changes and modifications without departing from the spirit or scope thereof.

What is claimed is:

1. An inductive coupler in a battery charging system for an electric vehicle comprising a primary device having a primary coil for connection to a power source, and a secondary device for mounting on said vehicle and having a secondary coil for coupling to a battery in said vehicle, said primary and secondary devices being assembleable with one of said primary and secondary coils being insertable within an open space defined by the other of said primary and secondary coils for coupling said coils electromagnetically to induce an electromotive force in said secondary coil upon establishing a current in said primary coil in the assembled condition of the coupler, said other of said primary and secondary coils being formed and sized larger than said one of said primary and secondary coils at least along a predetermined axis to provide a first clearance at least in the direction of said predetermined axis between said coils when assembled, said first clearance in the direction of said predetermined axis being greater than any clearance in the direction orthogonal to said predetermined axis, and means for mounting said primary device adjacent a space for parking said vehicle with means for moving said primary device at least horizontally into a selectable position for engaging and assuming said assembled condition with said secondary device.

2. An inductive coupler according to claim 1, wherein said other of said primary and secondary coils has a portion bent so as to provide a path through which said one of said primary and secondary coils is movable without colliding against said other of said primary and secondary coils to permit relative movement of said secondary coil away from said primary coil upon movement of said vehicle away from said primary device while said primary device is in said selectable position.

3. An inductive coupler according to claim 2, wherein said secondary device is provided with means for mounting on the rear bottom of the vehicle, said primary and secondary devices are assembleable with said primary coil placed within an open space defined by said secondary coil, and said path provided by said bent portion of said other of said coils is formed in the portion of said secondary coil that when mounted on a vehicle located in said space for parking said vehicle extends towards said primary device.

4. An inductive coupler according to claim 1, wherein said predetermined axis corresponds to the longitudinal direction of said space for parking said vehicle.

5. An inductive coupler according to claim 1, wherein said predetermined axis is related orthogonally to the longitudinal direction of said space for parking said vehicle.

6. An inductive coupler according to claim 1, wherein said primary and secondary devices are arranged at such an inclined disposition with respect to the longitudinal direction of said space for parking said vehicle that each of said coils can move relative to the other coil without colliding against the other when a vehicle is moved away from said primary device while said coupler is in the assembled position.

7. An inductive coupler in a battery charging system for an electric vehicle comprising a primary device having a primary coil and a core for connection to a power source, and a secondary device for mounting on said vehicle and having a secondary coil for coupling to a battery in said vehicle, said primary and secondary devices being assembleable with one of said primary and secondary coils being insertable within an open space defined by the other of said primary and secondary coils for coupling said coils electromagnetically to induce an electromotive force in said secondary coil upon establishing a current in said primary coil in the assembled condition of the coupler, said other of said primary and secondary coils being formed and sized larger than said one of said primary and secondary coils at least along a predetermined axis to provide a first clearance at least in the direction of said predetermined axis between said coils when assembled, said first clearance in the direction of said predetermined axis being greater than any clearance in the direction orthogonal to said predetermined axis, said core having a portion which is movable to form a closed magnetic circuit after said primary and secondary devices are assembled together, and means for mounting said primary device adjacent a space for parking said vehicle with means for moving said primary device at least horizontally into a selectable position for engaging and assuming said assembled condition with said secondary device.

8. An inductive coupler according to claim 7, wherein said core has an E-shape having first and second recesses respectively on opposite sides of a center leg of the E-shape for receiving therein part of said secondary coil.

9. An inductive coupler according to claim 8, wherein said movable portion of said core is rotatable so as to close said recesses after said primary and secondary devices are assembled together.

10. An inductive coupler according to claim 7, wherein said core has a C-shape having a recess therein for receiving therein part of said secondary coil.

* * * * *